No. 700,617. Patented May 20, 1902.
E. B. COBAUGH.
KNIFE.
(Application filed Jan. 18, 1902.)
(No Model.)
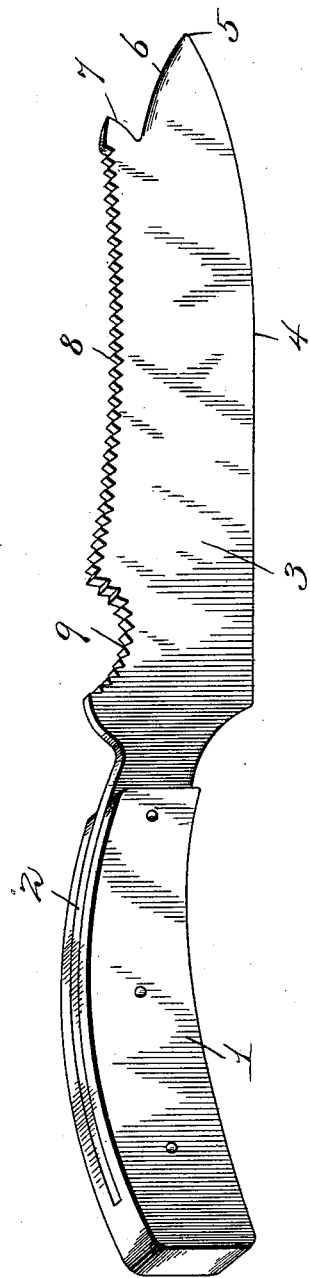
Witnesses
H. L. Amer,
Chas. S. Hyer.
Inventor
Ephraim B. Cobaugh.
By Victor J. Evans
Attorney

UNITED STATES PATENT OFFICE.

EPHRAIM B. COBAUGH, OF MIDDLETOWN, PENNSYLVANIA.

KNIFE.

SPECIFICATION forming part of Letters Patent No. 700,617, dated May 20, 1902.

Application filed January 13, 1902. Serial No. 89,498. (No model.)

*To all whom it may concern:*

Be it known that I, EPHRAIM B. COBAUGH, a citizen of the United States, residing at Middletown, in the county of Dauphin and State of Pennsylvania, have invented new and useful Improvements in Knives, of which the following is a specification.

This invention relates to a knife adapted for general use, but especially for hunters and fishermen; and the object of the same is to provide simple and effective means for cutting, scaling, skinning, and drawing the entrails of fish and game in an expeditious and practicable manner.

The invention consists in the construction and arrangement of the several parts, which will be more fully hereinafter described and claimed.

The drawing represents a perspective view of a knife embodying the features of the intion.

The numeral 1 designates a handle, which is preferably curved, as shown, for convenience in gripping the same and so constructed as to embrace a tang 2, extending from a blade 3. The features of the invention are embodied in the said blade and comprise the ordinary sharp or cutting edge 4, having a point 5, and from the said point rearwardly and upwardly the blade is formed with a blunt convex edge 6, terminating at the base of an upstanding sharpened spur 7, having its cutting edge projected forwardly. The back edge of the blade is formed for a greater portion of its length with a concave serrated edge 8, terminating at the rear in the forward terminal of a segmental serrated recess 9. The serrations or teeth of the edge 8 and recess 9 are preferably of inverted-V-shape form, and all the teeth are regular in dimensions and extend the full thickness of the blade at the point where they are located. The cutting edge 4 is used as in ordinary knives for forming incisions in fish or poultry and loosening a skin or severing joints and parts of game—such as rabbits, squirrels, deer, and the like—and the convex edge 6 is also useful in performing the function of a guard when the sharpened spur 7 is employed to disembowel or remove the entrails of fish without cutting into the latter. In the use of this spur it is inserted in the body of the fish at the proper point and pushed forwardly, the edge 6 preventing the spur from entering too deeply into the body of the fish, and thereby avoid cutting the entrails. This spur is also useful in many instances in skinning small animals, deers, or beeves where a combined pry and cutting edge is desired. The concave edge 8, with its serrations or teeth, is particularly convenient in scaling fish and is drawn over the bodies of the latter to loosen up the scales without resorting to a sharp edge, as in the usual methods, and by which the bodies of fish are frequently mutilated unnecessarily. This concave edge 8 is also adapted to be conveniently used in skinning fish, such as catfish and eels, by first using the sharpened edge 4 to cut around the head portions of such fish and then holding the skin over the edge 8 and exerting a pull on the blade. The segmental recess 9 is provided to give a finger or thumb hold in certain skinning operations and is therefore located near the handle 1. When the said recess 9 is brought into play, the skin is pressed downwardly into the same against the serrations or teeth thereof by the thumb of the operator, and a firm bite on the skin to be drawn from the body of the animal or fish treated is obtained and slipping or disengagement of the skin is practically impossible in view of the engagement of the serrations or teeth of the said recess with the skin under pressure thereon. The improved knife can also be used for plucking feathers from fowls or birds and will be found exceptionally convenient in use as a meat-tenderer. In performing this operation the blade is turned over and the meat beaten with the serrations or teeth on the back edge. The device can also be used for peeling potatoes, apples, or vegetables generally, and in view of the compact form of the same it can be packed in a very small space in a fishing or hunting kit. Moreover, the proportions of the device as an entirety may be varied for different uses.

Having thus described the invention, what is claimed as new is—

1. A knife having a blade with a sharpened edge extending the full length thereof and terminating in a point from which a convex blunt edge extends upwardly and rearwardly, a forwardly-projecting sharpened spur intersecting with the rear terminal of the said convex blunt edge, a concave serrated back portion, a serrated recess in the back portion, and a handle adjacent to the forward extremity of which the said serrated recess is located.

2. As an improved article of manufacture, a knife-blade having a sharpened edge and a concave back which is serrated its full length and has a serrated recess near the rear terminal thereof.

In testimony whereof I affix my signature in presence of two witnesses.

EPHRAIM B. COBAUGH.

Witnesses:
SAMUEL B. GINGRICH,
FRANK P. CARMANY.